(12) United States Patent
Inoue et al.

(10) Patent No.: US 12,084,799 B2
(45) Date of Patent: Sep. 10, 2024

(54) INDUSTRIAL FABRIC

(71) Applicant: NIPPON FILCON CO., LTD., Tokyo (JP)

(72) Inventors: Keisuke Inoue, Shizuoka (JP); Toru Egawa, Shizuoka (JP); Hideyuki Yanai, Shizuoka (JP)

(73) Assignee: NIPPON FILCON CO., LTD., Tokyo (JP)

( * ) Notice: Subject to any disclaimer, the term of this patent is extended or adjusted under 35 U.S.C. 154(b) by 0 days.

(21) Appl. No.: 17/054,075

(22) PCT Filed: Apr. 18, 2019

(86) PCT No.: PCT/JP2019/016560
§ 371 (c)(1),
(2) Date: Nov. 9, 2020

(87) PCT Pub. No.: WO2019/216149
PCT Pub. Date: Nov. 14, 2019

(65) Prior Publication Data
US 2021/0238784 A1    Aug. 5, 2021

(30) Foreign Application Priority Data
May 9, 2018    (JP) .................................. 2018-090299

(51) Int. Cl.
*D04H 3/04* (2012.01)
*D03C 1/00* (2006.01)
(Continued)

(52) U.S. Cl.
CPC ............... *D04H 3/16* (2013.01); *D03D 13/00* (2013.01); *D04H 3/14* (2013.01); *D03D 15/44* (2021.01)

(58) Field of Classification Search
None
See application file for complete search history.

(56) References Cited

U.S. PATENT DOCUMENTS

| 4,376,455 A | 3/1983 | Hahn |
| 5,546,643 A | 8/1996 | Hawes et al. |

(Continued)

FOREIGN PATENT DOCUMENTS

| CN | 1164878 A | 11/1997 |
| CN | 1564891 A | 1/2005 |

(Continued)

OTHER PUBLICATIONS

International Search Report issued in Application No. PCT/JP2019/016560, mailed Jul. 16, 2019.

(Continued)

*Primary Examiner* — Shawn Mckinnon
(74) *Attorney, Agent, or Firm* — Michael Best & Friedrich LLP

(57) ABSTRACT

According to the present invention, the curling or lifting of webs that occurs during the production nonwoven fabrics, and wrinkles that form on the surface of nonwoven fabrics are prevented. Also, the webs can be easily taken off without making grip stronger than necessary. The present invention pertains to an industrial fabric formed by weaving warp and weft, wherein an embossed pattern having a concavo-convex shape is formed in the vicinity of the apex of a knuckle portion exposed on the surface side of the warp and/or weft. In particular, the industrial fabric is characterized in that the warp and/or weft having the embossed pattern are plastic monofilaments.

8 Claims, 5 Drawing Sheets

(51) Int. Cl.
  *D03D 13/00*   (2006.01)
  *D03D 15/283*  (2021.01)
  *D03D 15/44*   (2021.01)
  *D04H 3/115*   (2012.01)
  *D04H 3/14*    (2012.01)
  *D04H 3/16*    (2006.01)
  *D06C 23/04*   (2006.01)

(56) References Cited

U.S. PATENT DOCUMENTS

| | | | | |
|---|---|---|---|---|
| 6,773,548 B1 * | 8/2004 | Thibierge | ............... | D21F 1/44 |
| | | | | 162/109 |
| 7,172,982 B2 | 2/2007 | Jaglowski et al. | | |
| 2008/0264275 A1 * | 10/2008 | Wilhelm | ............... | B31F 1/07 |
| | | | | 100/210 |

FOREIGN PATENT DOCUMENTS

| | | | |
|---|---|---|---|
| CN | 101663159 A | | 3/2010 |
| CN | 102112682 A | | 6/2011 |
| CN | 102439224 A | | 5/2012 |
| JP | H02-41462 A | | 2/1990 |
| JP | H05-179567 A | | 7/1993 |
| JP | 2002-105825 A | | 4/2002 |
| JP | 2006-512502 A | | 4/2006 |
| JP | 2008-013881 A | | 1/2008 |
| JP | 5749795 B2 | | 7/2015 |
| JP | 5749796 B2 | | 7/2015 |
| KR | 10-2005-0031063 A | | 4/2005 |
| KR | 10-2011-0042337 A | | 4/2011 |
| WO | WO9916964 | * | 4/1999 |
| WO | WO2006024327 | * | 3/2006 |

OTHER PUBLICATIONS

Extended Search Report Issued in European Application No. 19799765.3, dated Sep. 29, 2021.

Office Action issued in Chinese Application No. 201980030708.2, mailed Aug. 31, 2022.

Office Action issued in Korean Appplication No. 10-2020-7034530, mailed Mar. 24, 2023.

Office Action issued in European Application No. 19 799 765.3, mailed Jul. 11, 2023.

Office Action issued in Chinese Application No. 201980030708.2, dated Nov. 22, 2023.

* cited by examiner

FIG. 7

| | | The process conditions | | | air permeability | | gripping performance | | | | fabric thickness | |
|---|---|---|---|---|---|---|---|---|---|---|---|---|
| | Emboss patterns | feeding m/min | temp °C | pressure kg/cm | permeability cc | lowering rate | forward direction | improving rate | reverse direction | improving rate | thickness (mm) | decreasing rate |
| reference | | | | | 315 | | 0.26 | | 0.25 | | 1.95 | |
| example 1 | | 4 | 160 | 48 | 312 | 1.0% | 0.23 | -13% | 0.26 | 1% | 1.91 | 2.2% |
| example 2 | | 4 | 180 | 48 | 312 | 1.0% | 0.25 | -5% | 0.25 | -3% | 1.92 | 1.7% |
| example 3 | circular zigzag pattern | 4 | 180 | 71 | 307 | 2.5% | 0.24 | -11% | 0.25 | -2% | 1.87 | 3.8% |
| example 4 | | 4 | 180 | 95 | 299 | 5.1% | 0.25 | -4% | 0.24 | -4% | 1.84 | 5.6% |
| example 5 | | 6 | 180 | 71 | 308 | 2.2% | 0.25 | -6% | 0.25 | 0% | 1.88 | 3.4% |
| example 6 | | 8 | 180 | 71 | 310 | 1.6% | 0.23 | -12% | 0.26 | 3% | 1.89 | 3.0% |
| example 7 | | 4 | 200 | 48 | 308 | 2.2% | 0.51 | 92% | 0.61 | 142% | 1.81 | 7.3% |
| example 8 | | 4 | 160 | 24 | 313 | 0.6% | 0.44 | 67% | 1.03 | 304% | 1.94 | 0.7% |
| example 9 | | 4 | 160 | 48 | 308 | 2.2% | 0.32 | 20% | 1.11 | 338% | 1.90 | 2.4% |
| example10 | lateral stripe pattern | 4 | 160 | 71 | 307 | 2.5% | 0.38 | 43% | 2.50 | 883% | 1.87 | 4.3% |
| example11 | | 6 | 160 | 24 | 311 | 1.3% | 0.58 | 119% | 1.38 | 443% | 1.93 | 0.9% |
| example12 | | 8 | 160 | 24 | 311 | 1.3% | 0.67 | 153% | 1.29 | 407% | 1.94 | 0.7% |
| example13 | | 10 | 160 | 24 | 313 | 0.6% | 0.68 | 159% | 1.36 | 435% | 1.94 | 0.5% |

FIG. 8

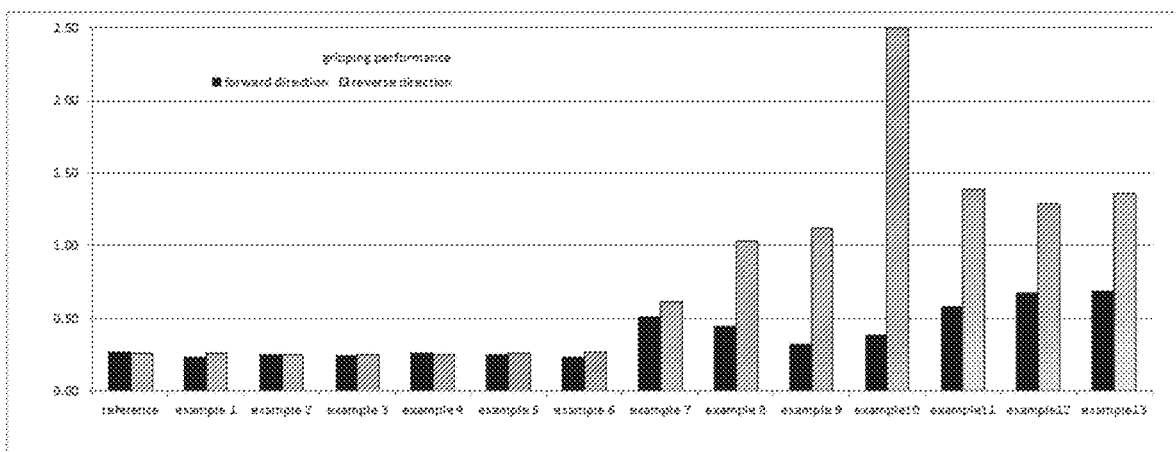

INDUSTRIAL FABRIC

TECHNICAL FIELD OF THE INVENTION

The present invention is related to an industrial fabric used in a process of manufacturing nonwoven fabric (referred to as "an industrial fabric" hereinafter), in particular, the industrial fabric which is suitable for preventing generation of wrinkles or rolling back of the nonwoven fabric during the manufacture of the nonwoven fabric.

More specifically, the present invention is related to the industrial fabric which is capable of making a manufacturing machine of the nonwoven fabric to operate at a higher speed, and of preventing generation of wrinkles or the rolling back of the web which conspicuously occurs in a case where a light nonwoven fabric is manufactured.

BACKGROUND ART

Conventionally, it has been generally prevalent that after a fiber assembly is fed on an endless running industrial fabric, the nonwoven fabric is formed while the fiber assembly (referred to as "web" hereinafter) is transported. Many kinds of methods of manufacturing the nonwoven fabric are widely known, and new technology for manufacturing the nonwoven fabric has been developed one after another.

Such being the case, it is difficult to clearly classify the types for manufacturing the nonwoven fabric. If the types for manufacturing the nonwoven fabric is classified, in view of the method of bonding the fibers, one type in which the fibers with low melting point is adopted as web, other type in which a composite fiber of core-sheath type covering the resin with low melting point is used, and still another type (thermal bonding method) in which web formed by powders with low melting point being mixed is fed to the industrial fabric, and the fibers with low melting point is melted by heating or by ultra-sonic welder to generate the welding of the portions between the fibers to form into the non-woven fiber are known. In addition, a resin bond method in which the web is fed to the industrial fabric, and adhesive resin is contained and dried to form the nonwoven fabric. Further, a chemical bonding method, a spun race method in which the fibers are entangled by water stream with high pressure.

On the other hand, if the method of manufacturing the nonwoven fabric, in view of the method of feeding the web, a carding method in which the web is fed using the carding machine, an air laid method in which the defibrate fibers is fed using air, and a spun bonding method in which the fibers spun into yarns from the fiber material is directly fed to the industrial fibers without using the fibers formed in advance, and the portions between the fibers is welded by heating, etc. are known as a method of using dry fibers. In addition, a melting blow method in which the fibers are spun like mist to fed to the industrial fabric.

Now, the industrial fabric is concretely explained below. The Patent publications 1 and 2 are exemplified as prior art of the industrial fabric.

In the industrial fabric used in the spun bonding method and the melting blow method, raw material for the nonwoven fabric is arranged in parallel or indefinitely on the front surface of the industrial fabric to form the web, and the nonwoven fabric is manufactured by the portions between the fibers being welded by heating, etc.. In such a case, since the nonwoven fabric to be manufactured is light, and, in the method of manufacturing the nonwoven fabric at a high speed in recent years, in particular, the web is caused to float due to the air stream generated around the web, so that technical troubles in which wrinkles are partially generated, or the end portion can be caused to roll back when the web is transported can arise.

FIG. 6 is a view showing a process of manufacturing the nonwoven fabric of a spun-bond type. As shown in FIG. 6, material form a hopper 61 is mixed, welded and stirred, etc. by an extruder 62, and an amount of melted material is extruded from a spin opening 64 by a gear pump 63 to be formed into long fibers. Then, the long fibers are exposed to cool wind to be fiberized by the ejector 65, and captured on the endless industrial fabric 70 which is suspended on guide rolls 71,72,73,74,75,76 to be rotated, whereby the web is formed by the fact that air is suck from the underside of the industrial fabric 70.

The web is pressurized and bonded by the heated compaction roll 66 and the calendar roll 67 to be formed into a nonwoven fabric SB in a sheet form, and raw nonwoven fabric in a roll form is formed by a winding apparatus 68.

The nonwoven fabric SB is a nonwoven fabric with long fibers, so that it is used for a variety of applications, such as a hygiene material such as diapers, sanitary products, life material, vehicle material, construction material, and agricultural material.

In addition, in recent years, since SB is comparatively thin and light, the roll back and the wrinkle problem can conspicuously arise, due to the speed up of the manufacturing apparatus.

In particular, a part, an end, of all of the web can float after it passes the compaction roll 66.

In addition, if the wrinkles are generated on the nonwoven fabric in a span-bond type, the quality of the final product can be deteriorated.

The present inventor devised to process the industrial fabric used in the process of manufacturing the nonwoven fabric in order to prevent the floating of the web, the generation of the rolling back or the wrinkles. More specifically, the present inventor carried out the method of coating the surface of the industrial fabric with resin. As a result, although the problem of the rolling back, etc. of the non-nonwoven fabric rested on the industrial fabric is temporarily solved, it was found out that the resin was peeled off from the surface having irregularities of the industrial fabric with time, so that the above effect was not lasted. In addition, the resin peeled off from the industrial fabric was mixed with the nonwoven fabric to be manufactured, so that the quality or the yield of the nonwoven fabric was deteriorated.

Next, the present inventor carried out a method of surface roughening by polishing the surface of the industrial fabric. As a result, it was found out that burr formed on the surface of the industrial fabric by the polishing was peeled off along with resin with time, or worn out due to the friction between the burr and the raw material, so that the effect derived from such burr turns out not to last. Further, the problems of reproducibility and workability were arisen.

Patent Publication 1: Japanese Patent No. 5749795
Patent Publication 2: Japanese Patent No. 5749796

DISCLOSURE OF THE INVENTION

Technical Problems to be Solved by Present Invention

The object of the present invention is to provide an industrial fabric which is capable of preventing the roll back or the floating of the web, and the wrinkles on the surface of the nonwoven fabric from being generated when the nonwoven fabric is manufactured.

The object of the present invention is to provide an industrial fabric which is capable of maintaining the rigidity as the industrial fabric, while at the same time, of preventing the roll back or the floating of the web, and the wrinkles from being generated for a long time during the web forming process.

The object of the present invention is to provide an industrial fabric which is capable of attaining a suitable gripping performance so as to smoothly remove the web without enhancing the adhesiveness to the web (referred to as "gripping performance" hereinafter) more than necessary when the web is transferred from the web forming process to the next process.

Means to Solve Technical Problems

The industrial fabric of the present invention includes following technical features in order to solve the above technical problems.

(1) In an industrial fabric formed by warps and wefts being woven with each other, at least an emboss pattern with irregularities is formed near an apex of a knuckle portion emerging on a front surface side in said warps and/or said wefts.

The technical feature of the present invention is that at least an emboss pattern with irregularities is formed near an apex of a knuckle portion emerging on a front surface side in said warps and/or said wefts. For example, if irregularities is formed on a portion other than the knuckle portion emerging on a front surface side in said warps and/or said wefts, the gripping performance becomes too much, so that the web cannot be smoothly removed when the web is transferred to the next process. The present invention solves such a problem. In other words, in the present invention, the web is gripped only when necessary, and the web can be smoothly transferred to the next process.

Here, the emboss pattern with irregularities means the pattern with irregularities formed on the surface of the warps and/or the wefts. More specifically, in a plan view is selected from a longitudinal stripe pattern, a lateral stripe pattern, an oblique stripe pattern (an oblique cross pattern), a rhomboid pattern, a concave circular pattern, an ellipse shape, an oblique ellipse shape, a circular houndstooth pattern, or a pattern arranged by plurality of these patterns.

(2) The industrial fabric according to claim 1, said warps and/or said wefts in which said emboss pattern with irregularities is formed is made of plastic mono-filament.

Since the tension force is applied on the industrial fabric in the warp direction, the yarn of the industrial fabric of the present invention is preferred to be made of mono-filament.

With respect to plastic mono-filament forming the industrial fabric of the present invention, usable examples of it include polyester, polyamide, polyphenylene sulfide, polyvinylidene fluoride, polypropylene, aramid, polyether ketone, polyethylene naphtha late, and polytetrafluoroethylene. Of course, yarns obtained using copolymers or incorporating or mixing the above-described material with a substance selected depending on the intended purpose may be used. In addition, with respect to plastic mono-filament forming the industrial fabric of the present invention, yarns with core-sheath structure in which material for layer portion is different from that for the inside can be used.

As the cross-section of the yarn, not only circular form but also square or short form such as stellar form, or elliptical form can be used.

(3) The industrial fabric according to claim 1 or 2 is constituted by a fabric used in the manufacturing of nonwoven fabric which is arranged in a parallel or in a non-parallel manner, and a portion between fibers of which is welded.

(4) The industrial fabric according to any of claims 1 to 3, the shape of said emboss pattern in a plan view is selected from a longitudinal stripe pattern, a lateral stripe pattern, an oblique stripe pattern, an oblique cross pattern, a rhomboid pattern, a concave circular pattern, an ellipse shape, a hexagonal pattern, an oblique ellipse shape, a circular houndstooth pattern, or a pattern arranged by plurality of these patterns, and the cutting depth of said emboss pattern is formed between 1% and 50% of a diameter of said warps and/or said wefts.

The cutting depth of the emboss pattern is set to be 1~50% of the diameter of the yarn. If the cutting depth of the emboss pattern is below 1% of the diameter of the yarn, the gripping performance is low, while If the cutting depth of the emboss pattern is above 50% of the diameter of the yarn, the strength of the yarn is weak, and the technical problem that the web cannot be smoothly removed when it is transferred to the next process due to the too strong gripping performance of the nonwoven fabric can arise. In particular, the cutting depth of the emboss pattern is preferred to be set to be 4~23% of the diameter of the yarn.

(5) The industrial fabric according to any of claims 1 to 4, wherein a gripping performance in a forward direction is set to be between 0.25 kgf and 1.00 kgf, and a gripping performance in a reverse direction is set to be between 0.26 kgf and 3.00 kgf.

Here, the gripping performance in the forward direction or in the reverse direction is the result of the fact that a coefficient of static friction of the non-nonwoven fabric rested on the industrial fabric on which the emboss pattern is formed is measured by using a tensile testing machine AG-IS (SHIMAZU SEISAKUSHO). More specifically, the nonwoven fabric is tensioned in the forward direction (the same direction as the direction in which it is passed through the emboss processing machine (referred to as "processing direction") and in the reverse direction (the direction reverse to the forward direction) with the weight of 0.2 kg being rested on the nonwoven fabric, and the coefficient of static friction of the non-nonwoven fabric is measured three times in each of the forward direction and the reverse direction, and finally, the three measured values are averaged.

When the industrial fabric is manufactured, the direction in which the lower coefficient of static friction of the industrial fabric is low among the results of measuring the grip property in the forward direction or reverse direction should be aligned with the traveling direction in which the industrial fabric is advanced in the nonwoven fabric manufacturing machine, the floating of the web can be prevented during the web forming process, so that the smooth transfer of the web to the next process can be realized.

If the gripping performance in the forward direction is equal to, or smaller than 0.25 kgf, or the gripping performance in the reverse direction is equal to, or smaller than 0.26 kgf, there is a risk that the floating of the web and the rolling back and the wrinkles of the web cannot be sufficiently prevented. On the other hand, if the gripping performance in the forward direction is equal to, or larger than 1.00 kgf, or if the gripping performance in the reverse direction is equal to, or larger than 3.00 kgf, there is a risk that the nonwoven fabric cannot be smoothly transferred from the web forming process to the next process.

(6) The industrial fabric according to claim any of claims 1 to 5, wherein a cross sectional shape of said warps and/or said wefts is a circle, a rectangle such as a quadrangle, a polygon such as a star, or an ellipse.

(7) A method of manufacturing an industrial fabric, said method comprises a step of weaving warps and wefts, and a step of forming at least an emboss pattern with irregularities near an apex of a knuckle portion emerging on a front surface side in said warps and/or said wefts by means of thermal emboss process.

(8) The method of manufacturing the industrial fabric industrial fabric according to claim 7, said warps and/or said wefts in which said emboss pattern with irregularities is formed is made of plastic mono-filament, the process of forming said emboss pattern by said thermal emboss process is carried out under a temperature between a glass transition point of plastic mono-filament and a melting point of plastic mono-filament, and a pressure between 10 kg/cm and 150 kg/cm.

An explanation is made about a case where the material of the plastic mono-filament is polyethylene terephthalate below as an example.

The glass transition point and the melting point of polyethylene terephthalate are 69° C. and 267° C. In a case where the temperature condition is below the glass transition point, the irregularities shape cannot be sufficiently formed on the surface of the industrial fabric, since the softening of the plastic mono-filament is insufficient. On the other hand, the temperature condition exceeds the melting point, the plastic mono-filament is caused to be welded, so that the configuration of the industrial fabric cannot be maintained. From the standpoint of the above, the temperature condition is more preferred to be set to be 100~250° C. In particular, the temperature condition is more preferred to be set to be 120~200° C.

In addition, in the present invention, the process is preferred to be carried out under the pressure condition of 10~150 kg/cm. If the pressure condition is below 10 kg/cm, the irregularities cannot be sufficiently formed on the surface of the industrial fabric. On the other hand, if the pressure condition exceeds 150 kg/cm, the thickness of the industrial fabric becomes thinned due to the excess process. Further, the mesh is collapsed, so that the air permeability is lowered. From the standpoint of the above, the pressure condition is more preferred to be set to be 20~100 kg/cm. In particular, the pressure condition is more preferred to be set to be 24~71 kg/cm.

(9) The method of manufacturing the industrial fabric according to claim 7 or 8, the shape of said emboss pattern formed by said thermal emboss process in a plan view is selected from a longitudinal stripe pattern, a lateral stripe pattern, an oblique stripe pattern, an oblique cross pattern, a rhomboid pattern, a concave circular pattern, an ellipse shape, a hexagonal pattern, an oblique ellipse shape, a circular houndstooth pattern, or a pattern arranged by plurality of these patterns, and the cutting depth of said emboss pattern is formed between 1% and 50% of a diameter of said warps and/or said wefts in the step of forming said emboss pattern.

Effect of the Invention

By adopting the industrial fabric according to the present invention, the roll back or the floating of the web, and the wrinkles on the surface of the nonwoven fabric can be prevented from being generated when the nonwoven fabric is manufactured.

By adopting the industrial fabric according to the present invention, the rigidity as the industrial fabric can be maintained, while at the same time, the roll back or the floating of the web, and the wrinkles can be prevented from being generated for a long time during the web forming process.

By adopting the industrial fabric according to the present invention, a suitable gripping performance so as to smoothly remove the web without enhancing the adhesiveness to the web more than necessary can be attained when the web is transferred from the web forming process to the next process.

BRIEF EXPLANATION OF DRAWINGS

FIG. 7 is a table showing process conditions, air permeability, gripping performance, and fabric thickness of the non-woven fabric of examples 1-13 with respect to a reference example.

FIG. 8 is a chart showing the gripping performance of the non-woven fabric in a forward direction and a reverse direction of examples 1-13 with respect to the reference example.

DETAILED DESCRIPTION OF THE INVENTION

Now, the structure and the effect of the fabric of the present invention will be described below. Embodiments of the fabric of the present invention will be described thereafter with reference to the drawings. In this connection, since the embodiment is just an example of the present invention, the embodiment which is not described hereinafter can be encompassed by the scope of the present invention.

First Embodiment

Figure 1:
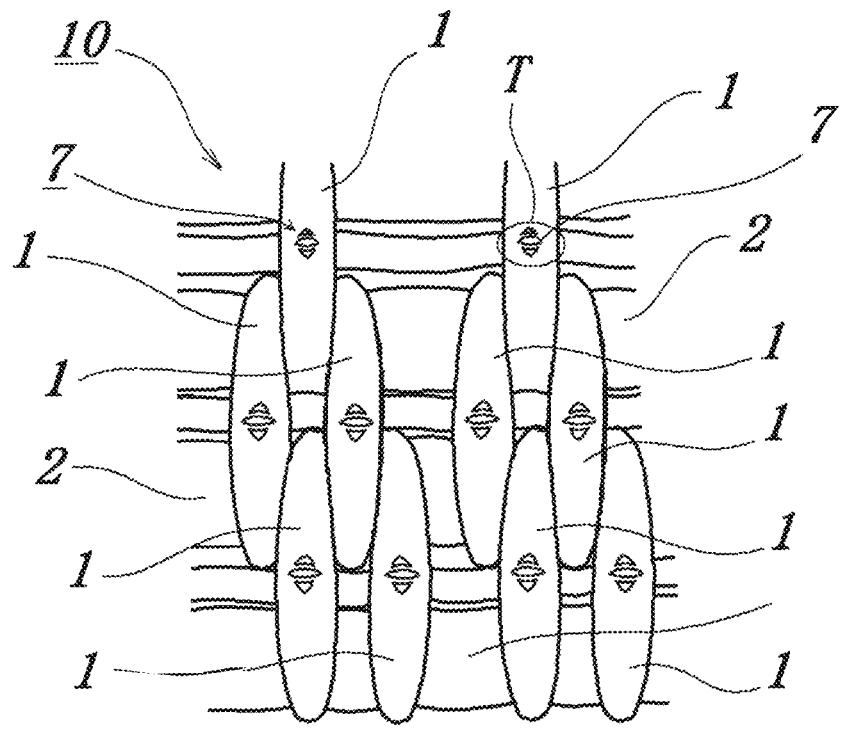
FIG. 1 is a plan view showing the industrial fabric of the first embodiment according to the present invention.

As shown in FIG. 1, the industrial fabric 10 of the Embodiment 1 of the present invention is the one formed by the warps 1 and the wefts 2 being woven with each other. Emboss concave patterns 7 are formed on only an portion T near an apex of the knuckle portions emerging on the front surface side of the warps 1. Such emboss patterns 7 are formed in lateral stripes.

By forming the emboss patterns 7, the web can be prevented from floating due to the fact that the abutting surface of the nonwoven fabric is caught in the emboss patterns 7, even if the web is rested on the industrial fabric 10. As a result, the wrinkles can be prevented from generating on the front surface of the web. In addition, the end portion of the nonwoven fabric can be prevented from rolling back. Further, when the web is transferred from the web forming process to the next process, the web can be smoothly transferred to the next process, since the abutting surface of the nonwoven fabric is not caused to be caught in the emboss patterns 7 more than necessary.

In this connection, the warps and the wefts in the industrial fabric in the first embodiment are made of polyethylene terephthalate.

With respect to the method of forming the emboss patterns in the industrial fabric in the First Embodiment, the industrial fabric is pressed against the emboss roll with convex portions. The pressing process is effected under the temperature of 180° C., and the pressure of 90 kg/cm.

Under such conditions, the emboss patterns with the cutting depth of 1%~50% in the lateral stripes can be formed by pressing the industrial fabric against the emboss roll with the convex portions.

Second Embodiment

Figure 2:
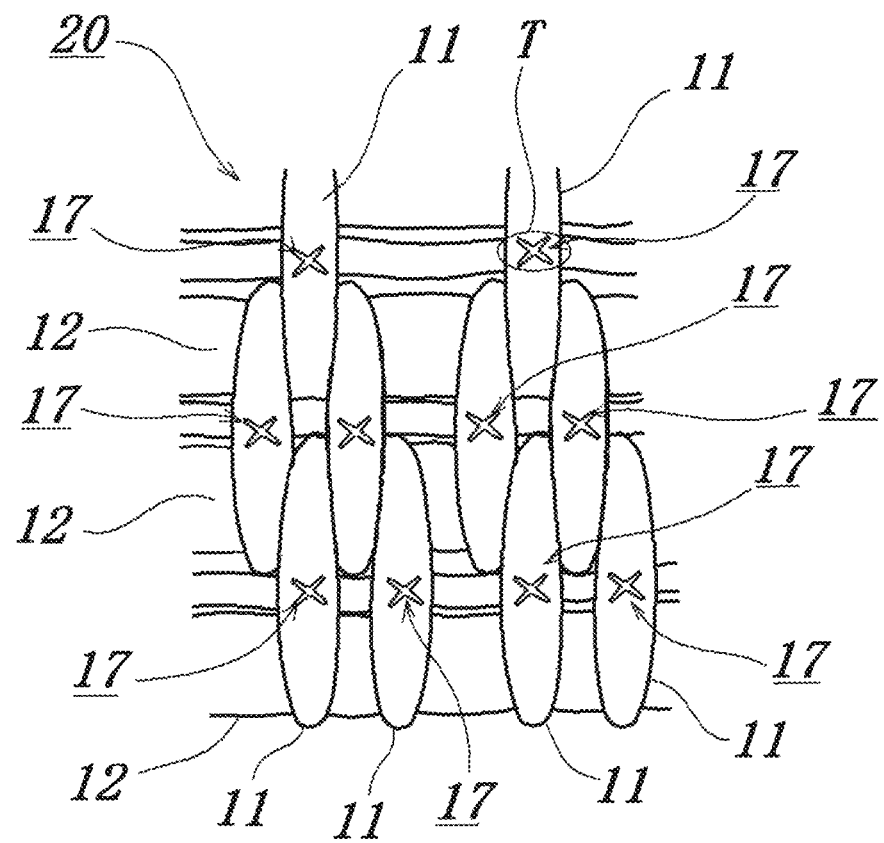
FIG. 2 is a plan view showing the industrial fabric of the second embodiment according to the present invention.

As shown in FIG. 2, the industrial fabric 20 of the second embodiment of the present invention is the one formed by the warps 11 and the wefts 12 being woven with each other. Emboss concave patterns 17 are formed on only a portion T near an apex of the knuckle portions emerging on the front surface side of the warps 11. Such emboss patterns 17 are formed in oblique cross patterns.

By forming the emboss patterns 17, the web can be prevented from floating, even if the web is rested on the industrial fabric 20. As a result, the wrinkles can be prevented from generating on the front surface of the web. In addition, the end portion of the nonwoven fabric can be prevented from rolling back. Further, when the web is transferred from the web forming process to the next process, the web can be smoothly transferred to the next process, since the abutting surface of the nonwoven fabric is not caused to be caught in the emboss patterns 17 more than necessary.

In this connection, the warps and the wefts in the industrial fabric in the second embodiment are made of polyamide.

Third Embodiment

Figure 3:
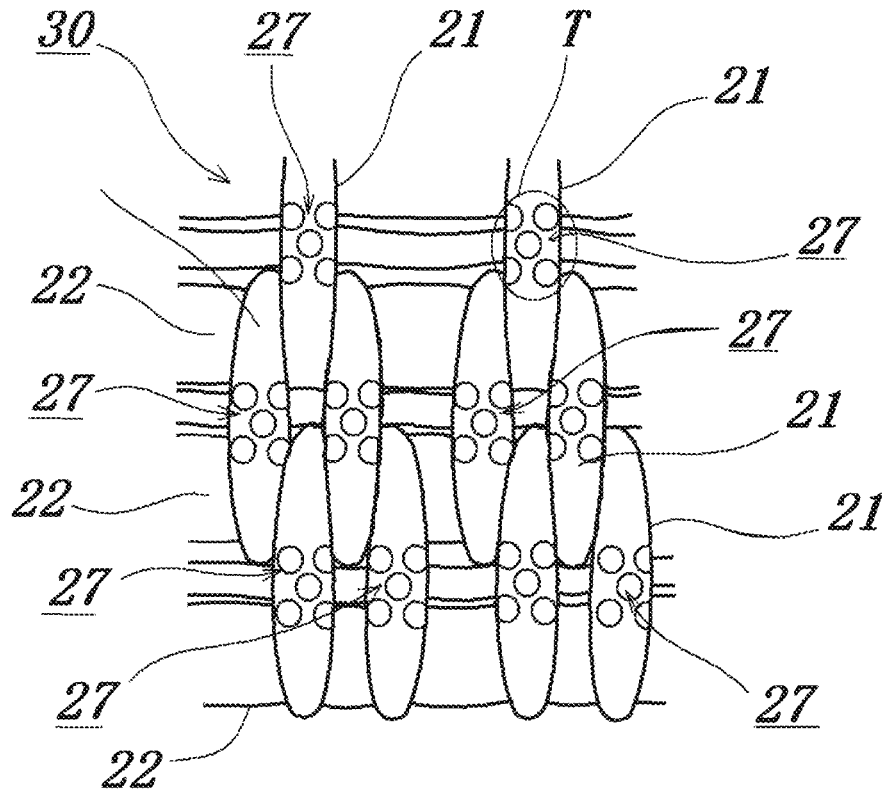
FIG. 3 is a plan view showing the industrial fabric of the third embodiment according to the present invention.

As shown in FIG. 3, the industrial fabric 30 of the third embodiment of the present invention is the one formed by the warps 21 and the wefts 22 being woven with each other. Emboss concave patterns 27 are formed on only a portion T near an apex of the knuckle portions emerging on the front surface side of the warps 21. Such emboss patterns 27 are formed in patterns in each of which circles are arranged in a zigzag.

By forming the emboss patterns 27, the web can be prevented from floating, even if the web is rested on the industrial fabric 30. As a result, the wrinkles can be prevented from generating on the front surface of the web. In addition, the end portion of the nonwoven fabric can be prevented from rolling back. Further, when the web is transferred from the web forming process to the next process, the web can be smoothly transferred to the next process, since the abutting surface of the nonwoven fabric is not caused to be caught in the emboss patterns 27 more than necessary.

In this connection, the warps and the wefts in the industrial fabric in the third embodiment are made of polyvinylidene fluoride.

Fourth Embodiment

Figure 4:
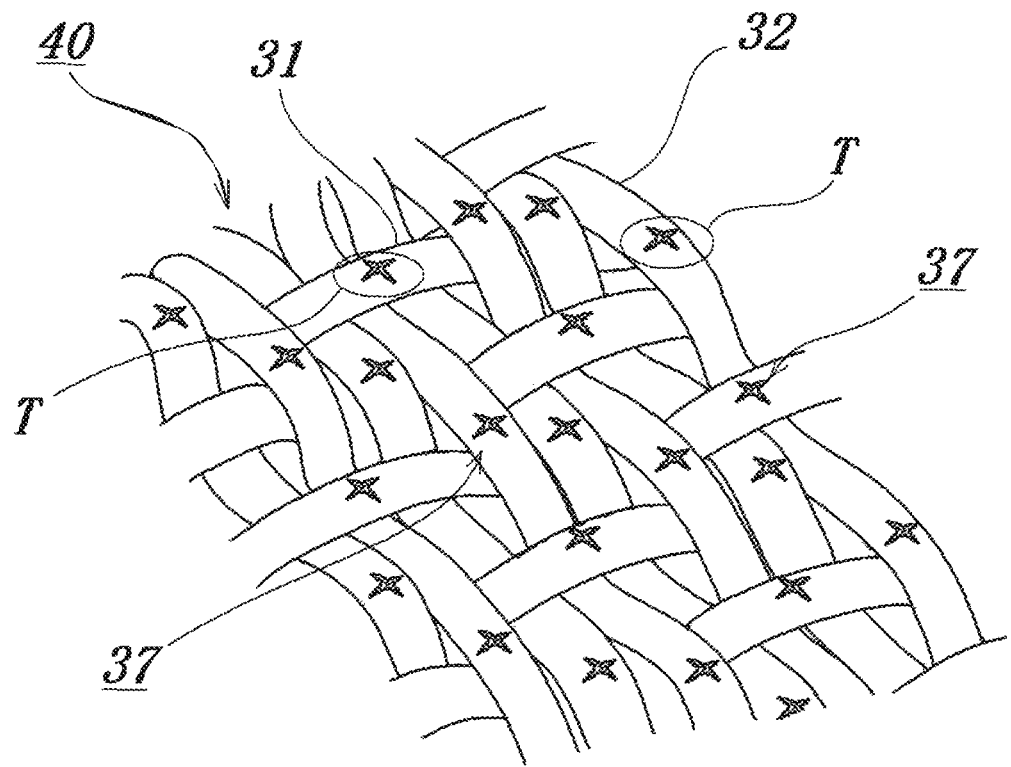
FIG. 4 is a partial perspective view showing the industrial fabric of the fourth embodiment according to the present invention.

As shown in FIG. 4, the industrial fabric 40 of the fourth embodiment of the present invention is the one formed by the warps 31 and the wefts 32 being woven with each other. Emboss concave patterns 37 are formed on only a portion T near an apex of the knuckle portions emerging on the front surface side of the warps 31. Such emboss patterns 37 are formed in oblique cross patterns.

By forming the emboss patterns 37, the web can be prevented from floating, even if the web is rested on the industrial fabric 40. As a result, the wrinkles can be prevented from generating on the front surface of the web. In addition, the end portion of the nonwoven fabric can be prevented from rolling back. Further, when the web is transferred from the web forming process to the next process, the web can be smoothly transferred to the next process, since the abutting surface of the nonwoven fabric is not caused to be caught in the emboss patterns 37 more than necessary.

In this connection, the warps 31 and the wefts 32 in the industrial fabric 40 in the fourth embodiment are made of polyethylene terephthalate and carbon yarns of core-sheath structure.

Fifth Embodiment

Figure 5:
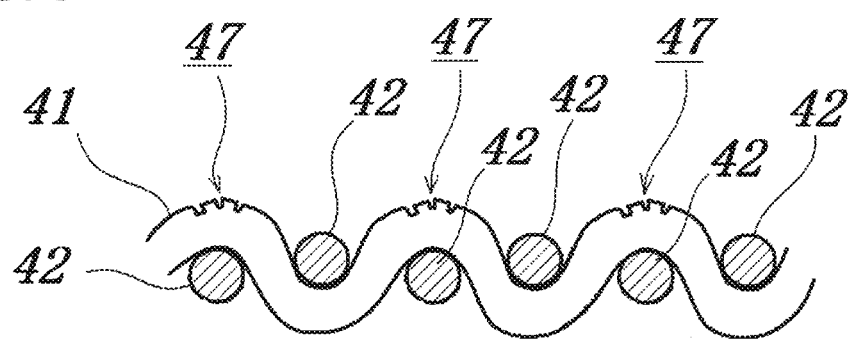
FIG. 5 is a cross sectional view showing the structure of the warps of the industrial fabric of the fifth embodiment according to the present invention.
Figure 6:
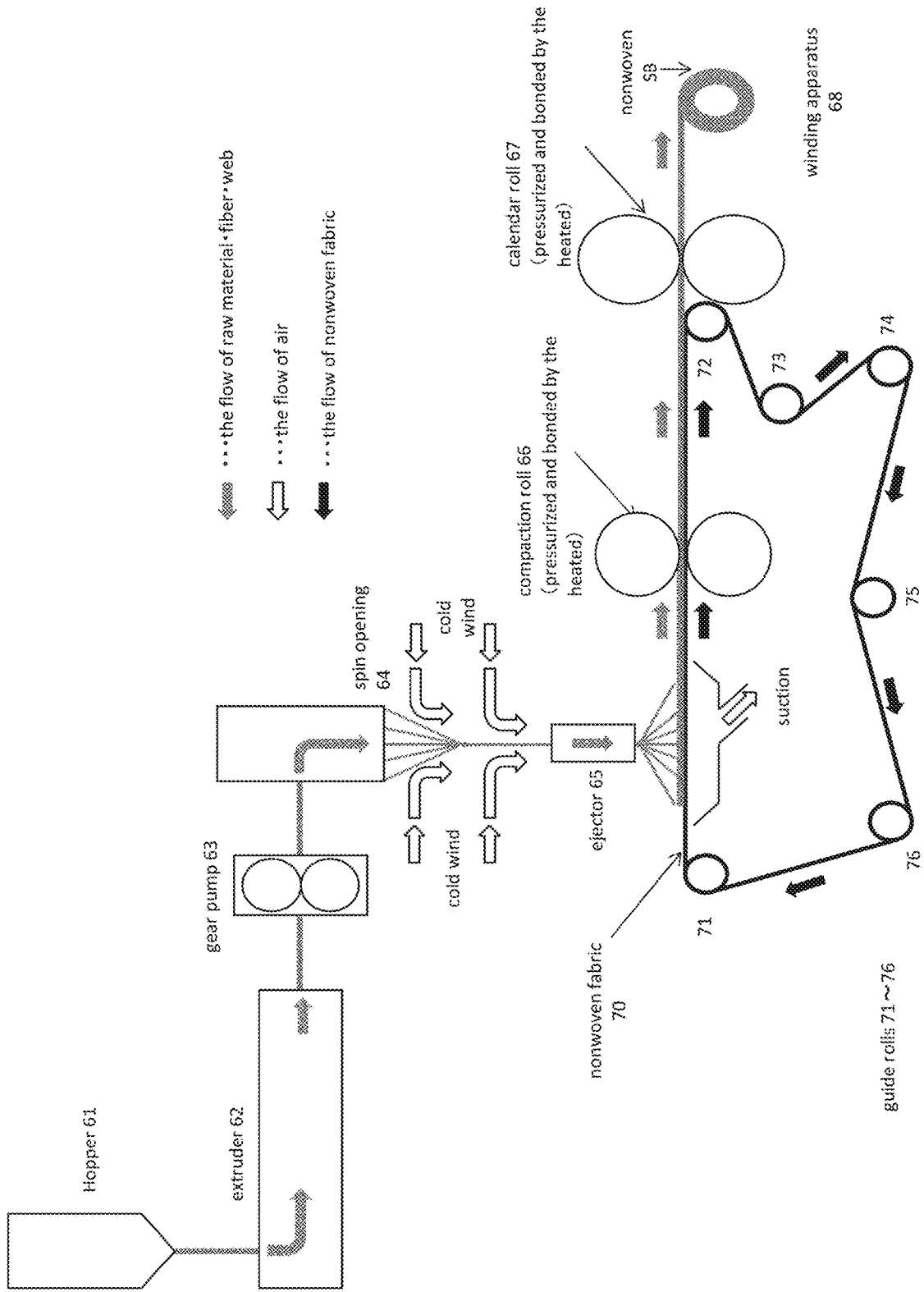
FIG. 6 is a general view showing the process of manufacturing the nonwoven fabric in the spun bonding type.

As shown in FIG. 5, the industrial fabric of the fifth embodiment of the present invention is the one formed by the warps 41 and the wefts 42 being woven with each other. Emboss concave patterns 47 are formed on only a portion T near an apex of the knuckle portions emerging on the front surface side of the warps 41. Such emboss patterns 47 are formed in concave manner.

By forming the emboss patterns 47, the web can be prevented from floating, even if the web is rested on the industrial fabric. As a result, the wrinkles can be prevented from generating on the front surface of the web. In addition, the end portion of the nonwoven fabric can be prevented from rolling back. Further, when the web is transferred from the web forming process to the next process, the web can be smoothly transferred to the next process, since the abutting surface of the nonwoven fabric is not caused to be caught in the emboss patterns 47 more than necessary.

In this connection, the warps 41 and the wefts 42 in the industrial fabric in the fifth embodiment are made of polyethylene terephthalate.

The emboss pattern of the industrial fabric of each of the embodiments 1 to 7 is a circular zigzag pattern in which the circles are arranged in a zigzag, the embodiments 8 to 13 is a lateral stripe pattern. In this connection, the emboss process is not applied to the industrial fabric of the reference example.

The following feeding speed, temperature, and pressure are the process conditions, in a case where the emboss patterns are formed on an apex of the knuckle portion emerging on the front surface side of the manufactured warps means of emboss processing.

The temperature is set between 160° C. and 200° ° C., the pressure is set between 24 kg/cm and 95 kg/cm, and the feeding speed is set between 4 m/min and 10 m/min. The process conditions in each of the embodiments are set in FIG. 7.

In the warps, there are yarns made of polyethylene terephthalate and yarns made of carbon with core-sheath structure. The diameter of the warp is 0.4 mm, and the cutting depth of the hounds tooth pattern in polyethylene terephthalate is about 0.016 mm (its ratio to diameter is 4.0%), while the cutting depth of the carbon yarns is about 0.075 mm (its ratio to diameter is 19%).

On the other hand, the cutting depth of the lateral stripe in polyethylene terephthalate is about 0.057 mm (its ratio to diameter is 14%), while the cutting depth of the carbon yarns is about 0.057 mm (its ratio to diameter is 14%).

As clearly seen from FIGS. 7 and 8, as compared with the reference example, a certain gripping performance was caused in the industrial fabric in each of the embodiments. The industrial fabric in each of the embodiments 7-13 conspicuously attained the preferred gripping performance. The emboss pattern formed in the embodiments 8-13 was a lateral stripe pattern.

With respect to the industrial fabric in the embodiment 7, the air permeability and the gripping performance (the forward and the reverse directions: the unit is "kgf") were excellent, the decreasing rate of the fabric thickness to the reference example was 7.3%. The industrial fabric with a little decreasing rate of the fabric thickness is evaluated to be a good product.

With respect to the industrial fabric in the embodiments 1~6, the gripping performance, etc. was inferior to the industrial fabric in the embodiments 7~13. In particular, the air permeability in the embodiment 4 was low. In addition, the gripping performance (the forward direction) was low in the embodiments 1~6. Further, the gripping performance (the reverse direction) was also low in the embodiments 2~4. The decreasing rate of the fabric thickness was bad in the embodiment 4, in particular.

Still further, in a case where these industrial fabrics were used in the nonwoven fabric manufacturing machine, the floating of the web, the rolling back or the wrinkles of the web was not caused. No special technical problem was not arisen when the web was transferred from the web forming process to the next process.

What is claimed is:

1. An industrial fabric used in a process of manufacturing a non-woven fabric comprising:
   warps and wefts woven with each other, wherein:
   all embossed knuckles of the warps comprises an emboss concave pattern only at or near an apex of the knuckle whereby reducing floating of the non-woven fabric during a manufacturing of the non-woven fabric,
   wherein a cutting depth of said emboss concave pattern is formed between 4%~ 23% of a diameter of said warps, and
   wherein some of the warps, some of the wefts, or some of the warps and the wefts are made of carbon yarns.

2. The industrial fabric according to claim 1, wherein:
   the emboss concave pattern is one selected from a group consisting of a longitudinal stripe pattern, a lateral stripe pattern, an oblique stripe pattern, an oblique cross pattern, a rhomboid pattern, a concave circular pattern, an ellipse shape, a hexagonal pattern, an oblique ellipse shape and a circular houndstooth pattern.

3. An industrial fabric comprising:
   warps and wefts woven with each other, wherein:
   all embossed knuckles of the wefts comprises an emboss concave pattern only at or near an apex of the knuckle, whereby reducing floating of a non-woven fabric during a manufacturing of the non-woven fabric,
   wherein a cutting depth of said emboss concave pattern is formed between 4%~ 23% of a diameter of said warps, and
   wherein some of the warps and the wefts are made of carbon yarns.

4. The industrial fabric according to claim 3, wherein:
   the emboss concave pattern is one selected from a group consisting of a longitudinal stripe pattern, a lateral stripe pattern, an oblique stripe pattern, an oblique cross pattern, a rhomboid pattern, a concave circular pattern, an ellipse shape, a hexagonal pattern, an oblique ellipse shape and a circular houndstooth pattern.

5. A method of manufacturing the industrial fabric according to claim 1, said method comprising:
   weaving the warps and the wefts; and
   forming the emboss concave pattern by a thermal emboss process.

6. The method according to claim 5, wherein:
   the thermal emboss process is in a temperature between a glass transition point of plastic mono-filament and a melting point of a plastic mono-filament, and in a pressure between 10 kg/cm and 150 kg/cm.

7. The industrial fabric according to claim 1, wherein:
   the emboss concave pattern is formed by a thermal emboss process.

8. The industrial fabric according to claim 3, wherein:
   the emboss concave pattern is formed by a thermal emboss process.

* * * * *